United States Patent [19]

Steimmel et al.

[11] Patent Number: 5,800,024
[45] Date of Patent: Sep. 1, 1998

[54] MOTOR VEHICLE REAR AXLE AND METHOD OF PRODUCING SAME

[75] Inventors: Franz Steimmel, Bad Honnef; Walther Hasenpatt, Lengerich; Kai-Uwe Jentsch, Moers; Jorg Ebert, Cologne; Dieter Bungarten, Neustadt; Olaf Elsner, Bonn; Herbert Linden, Swisttal; Michael Hellenkamp, Wesseling; Gerhardt Sollner, St. Augustin; Karl-Heinz von Zengen, Bonn; Peter Harbig, Werther; Joachim Löwen, Bielefeld, all of Germany

[73] Assignee: VAW Aluminium AG, Germany

[21] Appl. No.: 561,101

[22] Filed: Nov. 21, 1995

[30] Foreign Application Priority Data

Nov. 25, 1994 [DE] Germany ............ 44 41 971.6

[51] Int. Cl.[6] .................................................. B60B 35/06
[52] U.S. Cl. ...................... 301/127; 180/905; 280/723
[58] Field of Search ........................ 296/203, 204; 307/127; 180/905; 280/721, 723

[56] References Cited

U.S. PATENT DOCUMENTS

| 4,057,263 | 11/1977 | Schwuchow et al. | 280/106 |
|---|---|---|---|
| 4,082,578 | 4/1978 | Evancho et al. | 148/12.7 |
| 4,450,926 | 5/1984 | Suzuki | 180/312 |
| 4,593,949 | 6/1986 | Tanimoto | 296/204 |
| 4,842,298 | 6/1989 | Jarvis | 280/689 |
| 5,127,704 | 7/1992 | Komatsu | 296/204 |
| 5,226,696 | 7/1993 | Klages et al. | 296/203 |
| 5,271,687 | 12/1993 | Holka et al. | 403/233 |
| 5,332,281 | 7/1994 | Janotik et al. | 296/209 |
| 5,364,128 | 11/1994 | Ide | 280/784 |
| 5,567,005 | 10/1996 | Kosuge et al. | 296/204 |

FOREIGN PATENT DOCUMENTS

| 0548859A1 | 6/1993 | European Pat. Off. . |
|---|---|---|
| 4330192A1 | 3/1994 | Germany . |

*Primary Examiner*—David M. Mitchell

[57] ABSTRACT

The invention relates to an integral motor vehicle rear axle of the twist-beam axle type, which comprises an opposed pair of longitudinal control arms (2) of a high flexural strength and torsional stiffness for carrying a wheel carrier for a wheel, and a transverse strut (3) which is resistant to bending but resilient relative to torsional stress and which comprises a profiled cross-section changing the position of the shear center. The transverse strut (3) consists of an extruded aluminum profile with an extrusion structure extending in the longitudinal direction of the transverse strut. A method of producing a motor vehicle rear axle of the twist-beam axle type using transverse struts and longitudinal control arms consists in joining the longitudinal control arms (2) with a transverse carrier (3) which, at its end, comprises a bore, opening or bonding surface extending transversely to the longitudinal axis, and in connecting said longitudinal control arms by hydro-forming in a form-fitting and force-locking way.

5 Claims, 15 Drawing Sheets

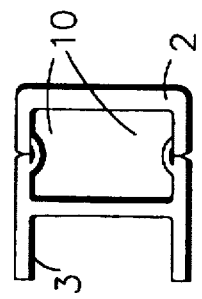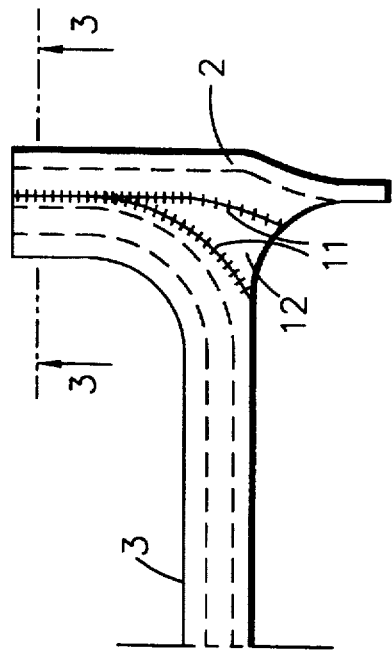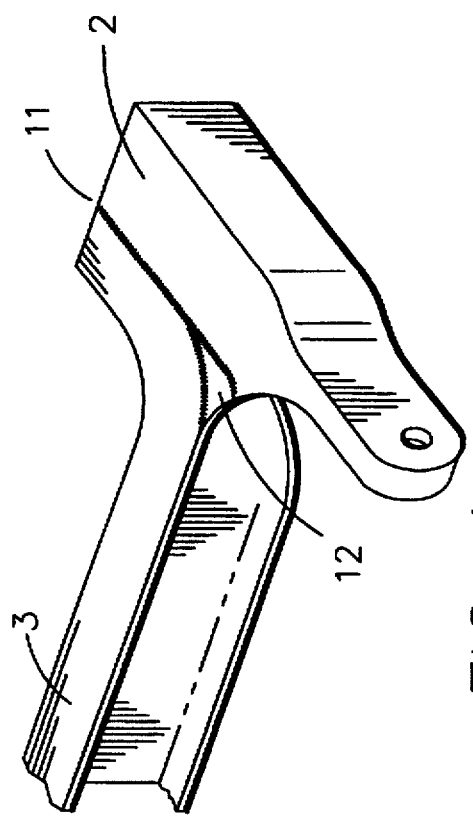

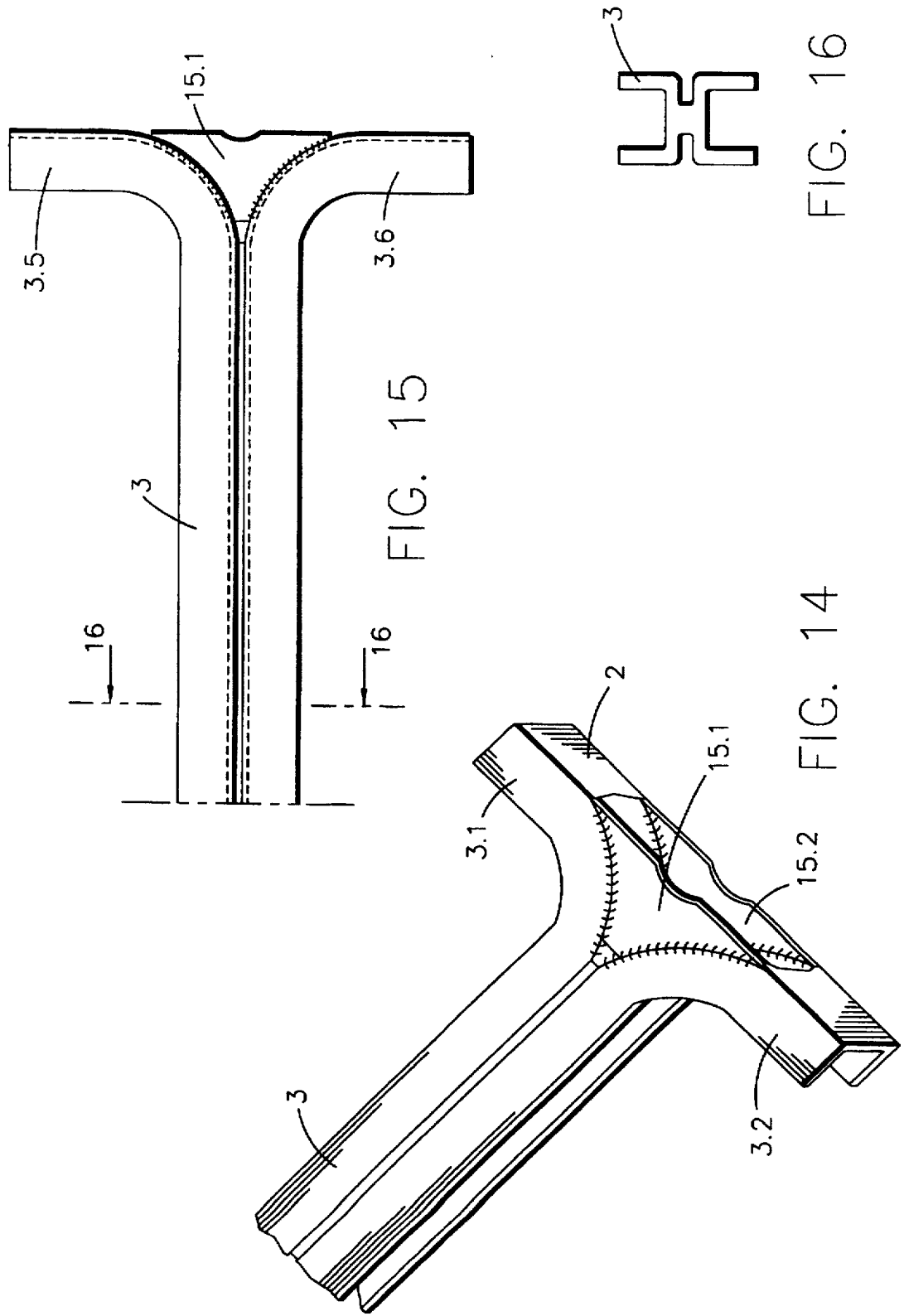

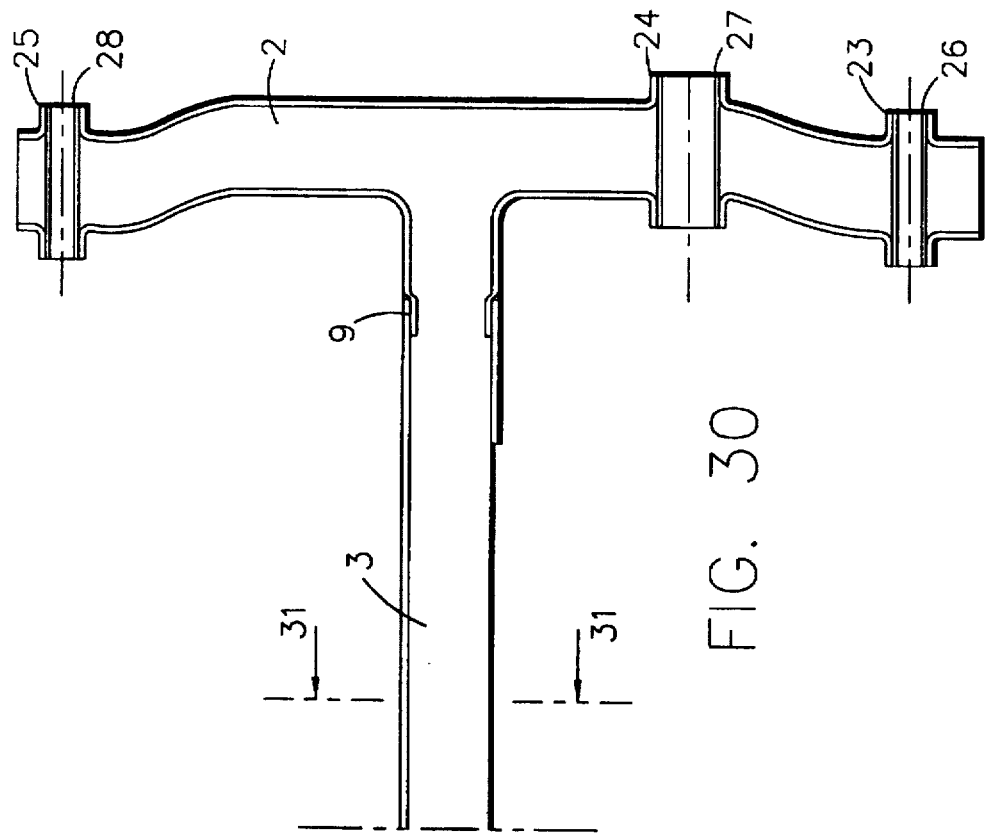
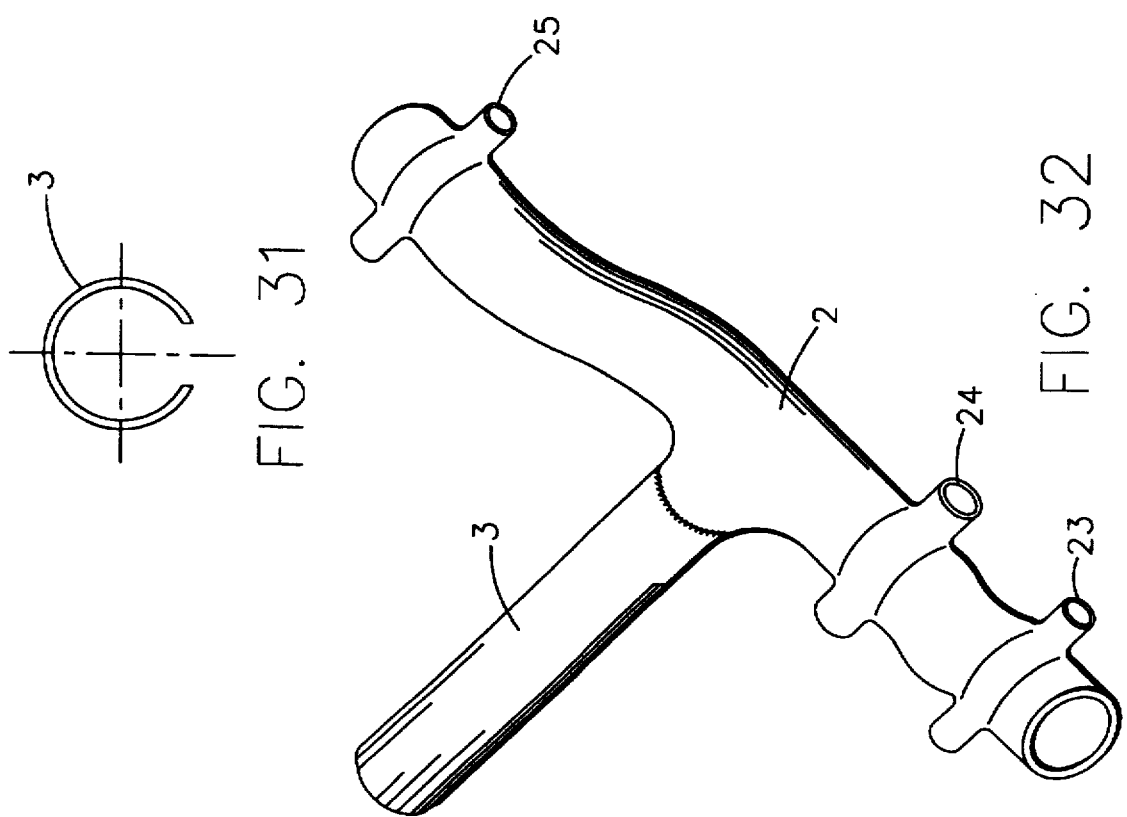

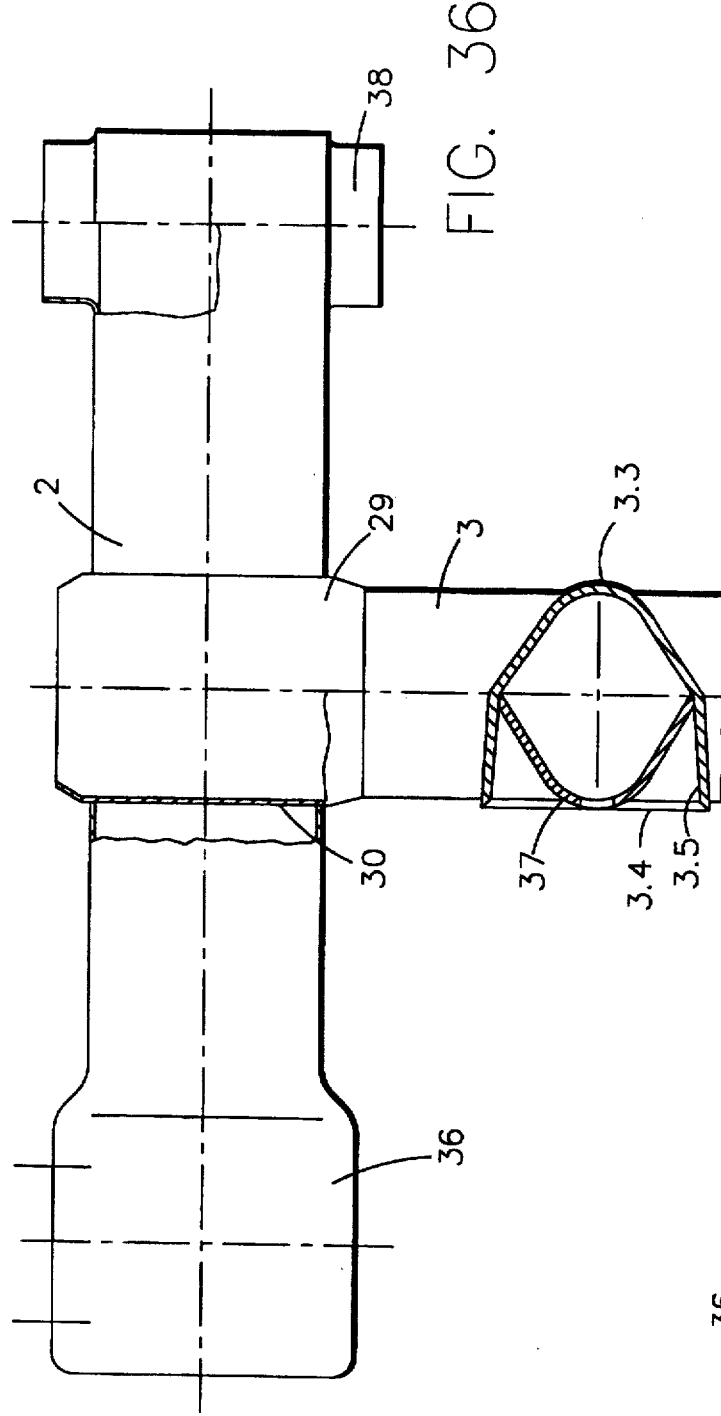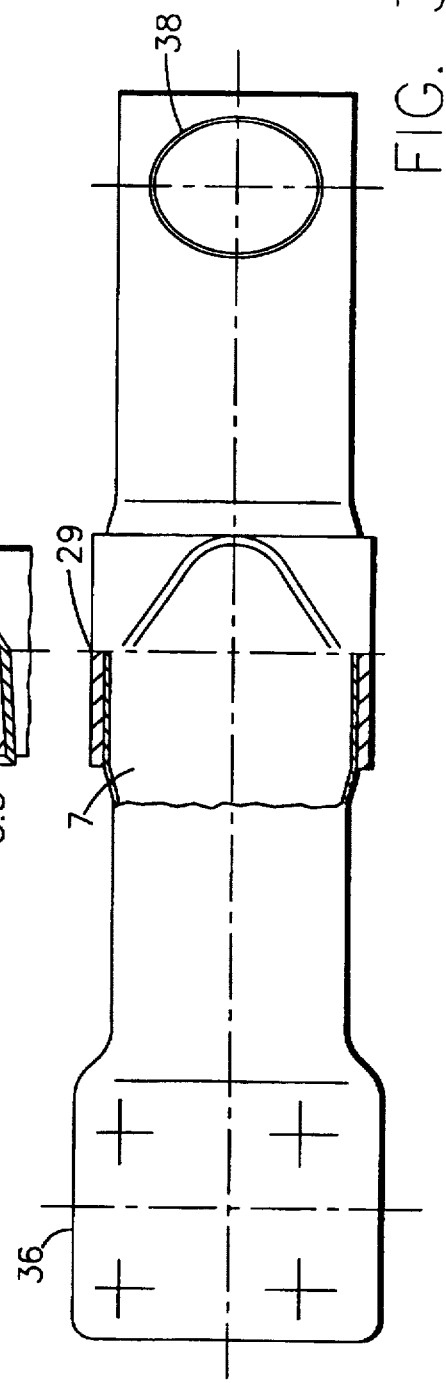

MOTOR VEHICLE REAR AXLE AND METHOD OF PRODUCING SAME

BACKGROUND OF THE INVENTION

The invention relates to a motor vehicle rear axle of the twist-beam axle type, comprising a longitudinal control arm 2 of a high flexural strength and torsional stiffness which carries a wheel carrier for a wheel, and a transverse strut 3 which is resistant to bending but resilient relative to torsional stress and which comprises a profiled cross-section changing the position of the shear center. The invention also relates to a method of producing said motor vehicle rear axle control arm assembly.

Motor vehicle rear axles of the aforementioned type are known from DE 43 30 192 A1 wherein a transverse strut profile in the shape of a U-profile is aligned and fitted in such a way that the upwardly extending angular U-profile raises the potential torsional axis of the transverse strut and achieves a correspondingly high shear center. The purpose of using such a U-profile is to achieve a method of construction which is uncomplicated from the point of view of welding technology and a good natural steering behavior due to only little or no oversteering tendencies. The prior art U-profile is bent out of metal plate with a uniform wall thickness. In the regions of transition to the longitudinal control arms, the legs of the U-profile are welded together to form a rigid box profile, with the two ends of the transverse strut being inserted into laterally open longitudinal control arms and connected to upper and lower plate metal dishes.

The U-profile of the transverse strut as described in DE 43 30 192 A1 is not uniformly aligned along the entire length of the transverse strut, as has previously been the case, but in the region between the two longitudinal control arms it is twisted around the longitudinal axis of the transverse strut, relative to the transverse strut ends welded to the longitudinal control arms, such twisting being such that in the central portion of the transverse strut, the axis of symmetry of the U-profile assumes a different inclination relative to the longitudinal extension of the longitudinal control arm and the road surface plane than in the end portions welded to the wall portions. Such twisting achieves the initially mentioned displacement of the hypothetical torsional axis and shear center within a narrow range illustrated by the axes I and II in FIG. 1 of DE 43 30 192 A1.

For a large number of applications, the possibility of a limited displacement of the shear center according to DE 43 30 192 A1 is not adequate. Furthermore, as far as the wall thicknesses of the U-profile are concerned, which, for reasons of weight, have to be thin, the permissible load values, especially in the case of cyclic loads, have to be kept very low for a transverse strut produced in the conventional way, because the twisted arrangement of the transverse strut ends may lead to a great deal of deformation and, in the case of excessive loads, even to cracks in the surfaces of the transverse struts, thus increasing the risk of fracture of the motor vehicle rear axle.

With reference to a motor vehicle rear axle of the initially mentioned type it is therefore the object of the invention to achieve a high degree of variability in arranging the torsional axis and shear center and thus a largely independent possibility of creating the natural steering behavior and, at the same time, to increase the permissible load values, especially in the case of cyclic loads, while achieving advantageous weight/wall thickness ratios.

SUMMARY OF THE INVENTION

In accordance with the invention, the objective is achieved by the characteristics of the appended apparatus claims. An advantageous method of producing the motor vehicle rear axle in accordance with the invention is described by the characteristics of the appended method claims.

Comprehensive tests have shown that, under certain conditions, using extruded aluminum profiles for producing transverse struts leads to surprising advantages with the following characteristics;

1. great variability in arranging the hypothetical torsional axis of the transverse strut and the shear center;

2. a high specific load relative to the weight of the composite steering axle;

3. the connection with the longitudinal strut is resistant to torsion and bending.

One of the most important preconditions for achieving a suitable design of the transverse strut in accordance with the invention is that is comprises an extruded aluminum profile with an extrusion structure extending in the longitudinal direction of the transverse strut, which measure acts against the vaulting force occurring under conditions of torsion, so that in spite of the extruded profile being greatly deformed, cracks due to overloading cannot occur.

In a further embodiment of the inventive concept, the structure of the extruded profile comprises a banded arrangement of primary precipitates of type AlMn, AlMnFe and AlFe.

The advantages of the motor vehicle rear axle in accordance with the invention can be utilized particularly advantageously by means of an aluminum alloy of the following composition:

| | |
|---|---|
| Magnesium | 0.4–1.4% |
| Silicon | 0.4–1.5% |
| Copper | 0.01–1.0% |
| Iron | 0.1–0.8% |
| Manganese | 0.01–1.0% |
| Chromium max. | 0.3% |
| Zirconium max. | 0.3% |

Balance aluminum and production-related impurities.

DESCRIPTION OF THE DRAWINGS

The invention will be explained in greater detail with reference to several embodiments illustrated in the attached drawings wherein:

FIGS. 1 to 9 show an axle segment comprising a transverse strut/longitudinal control arm assembly in accordance with the invention, the strut having a double-T profile cross-section.

FIGS. 14 to 16 show an axle segment comprising a transverse strut consisting of a double-T-profile with a slotted roof surface, integrated into a longitudinal control arm;

FIGS. 20 to 38 show axle segments comprising transverse struts consisting of slotted tubes with different connections to the longitudinal struts or control arms;

FIGS. 1 to 9 show embodiments of a transverse strut 3 welded to a longitudinal control arm 2 in accordance with the invention, consisting of an extruded strut profile which, in a cross-sectional view, is double-T-shaped. FIGS. 1 to 6 show two different means for connecting the longitudinal carrier or control arm 2 which is U-shaped in a cross-sectional view, with a backing support 10 being provided in the connecting zone. The weld 11 extends in said backing support 10, and in FIG. 1 to 3 it is necessary to provide a complementary piece 12 to ensure adaptation to the base of the transverse strut 3. In FIGS. 4 to 6, there is no need for such a complementary piece because the curved shape is cut out of the leg of the U-profile 2. In FIGS. 7 to 9, the cross-section of the longitudinal carrier 2 has the shape of a double-T-profile, so that here again, similarly to FIGS. 4 to 6, the adapting piece ensuring adaptation to the curved transverse carrier in the zone of transition can be cut out of the roof portion of the double-T-profile. Of the embodiments illustrated, the design according to FIGS. 7 to 9 is the most advantageous from the point of view of stiffness and connection to the longitudinal control arm.

Figure 6:
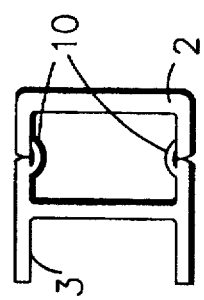
Figure 5:
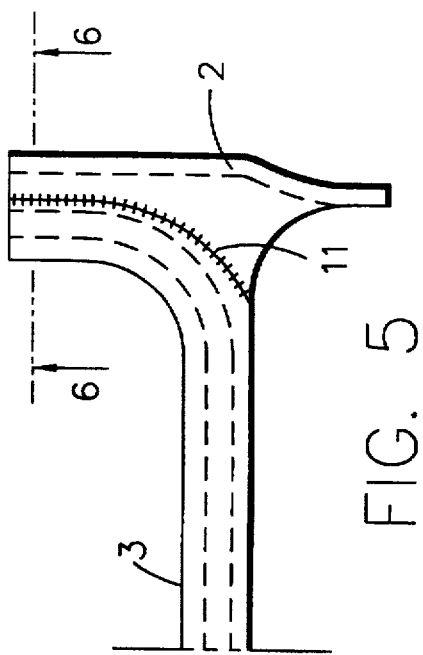
Figure 4:
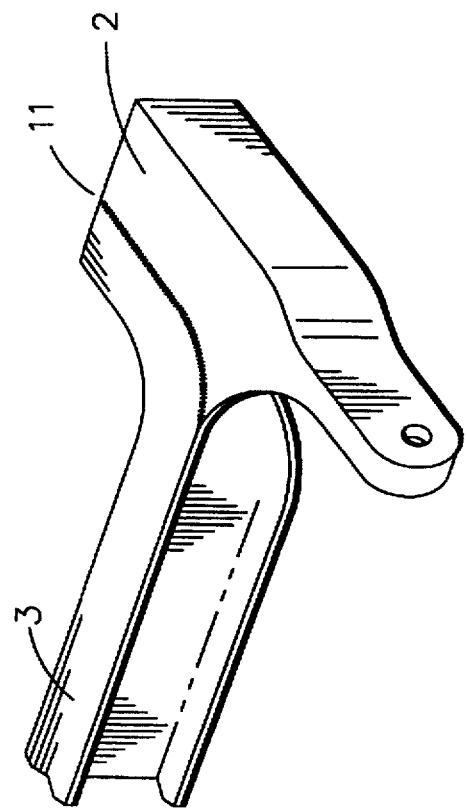
Figure 9:
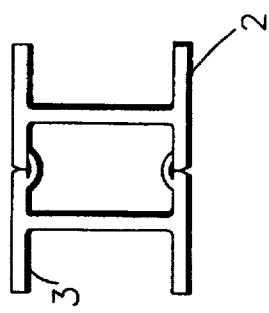
Figure 8:
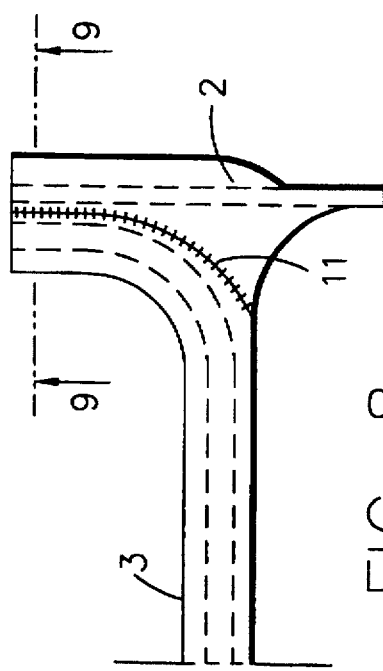
Figure 7:
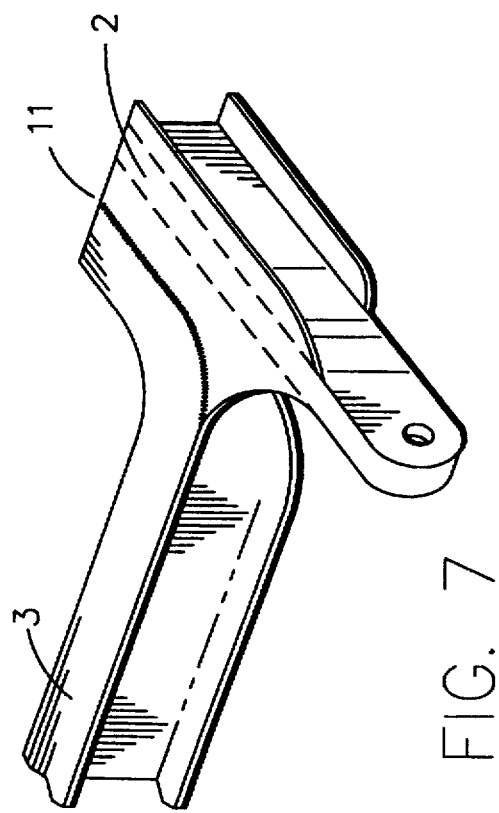
Figure 12:
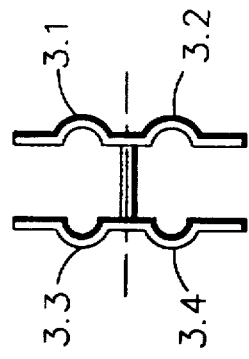
FIGS. 10 to 13 show an axle segment comprising a transverse strut/longitudinal control arm assembly consisting of a double-T-profile with a ribbed roof surface.
Figure 13:
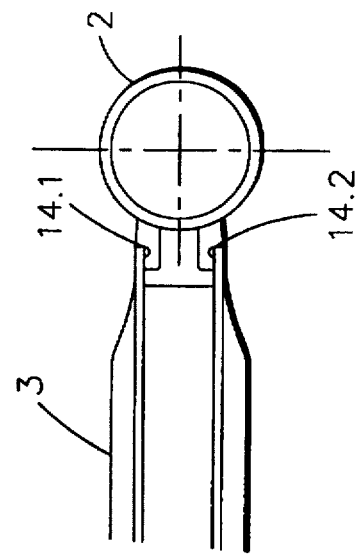
Figure 11:
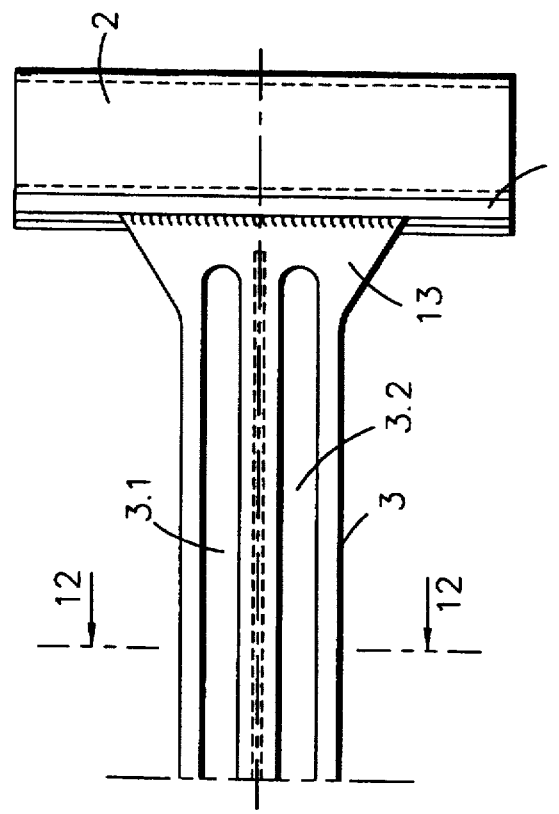
Figure 10:
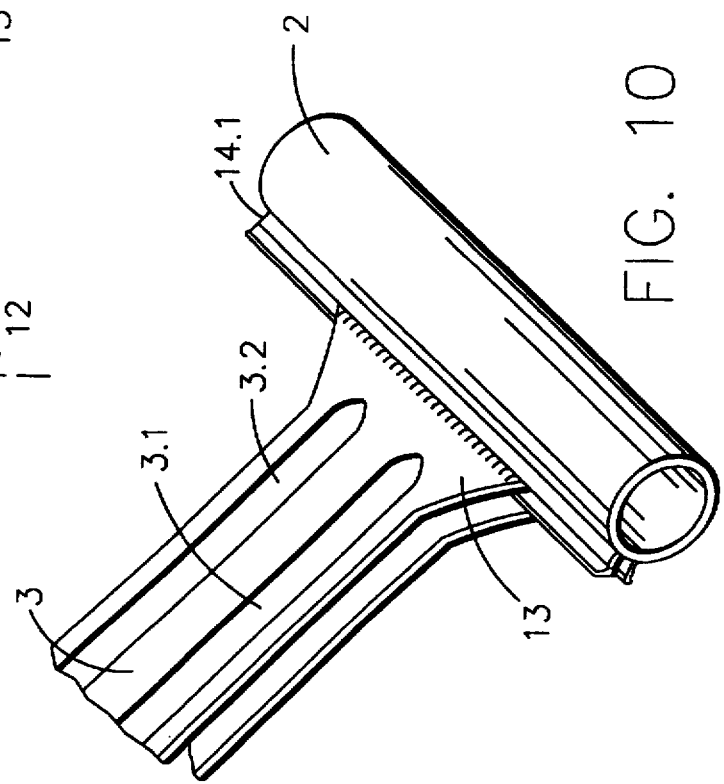

It should be understood that the present drawings illustrate only half segments of the present twist beam axles since the complimentary non-illustrated segments are identical thereto and integral therewith by means of the continuous transverse strut 3 which is integral with the opposed control arms 2. Each control arm is attached to a wheel carrier plate by conventional means such as welding, bolts, etc. The conventional wheel carrier plates support the wheels of the vehicle in a manner well known to those skilled in the art.

FIGS. 10 to 13 illustrates a double-T-profile transverse strut 3 in accordance with the invention, having a longitudinal carrier 2 in the form of a round tube. The roof of the double-T profile is ribbed, with the ribs 3.1 and 3.2 in the zone of transition to the longitudinal carrier 2 being flattened, thus producing a widened region 13 permitting a more advantageous connection to the longitudinal control arm 2. For the purpose of receiving the flattened region 13, the longitudinal control arm 2 is provided with an upper and lower flange or backing support 14.1, 14.2, in the longitudinal direction of the longitudinal control arm 2. As a result, the force can flow interference-free from the transverse control arm 3 into the longitudinal control arm 2.

A further variant of the double-T-profile of the transverse strut 2 in accordance with the invention is shown in FIGS. 14 to 16. The central web of the double-T-profile in accordance with the invention is notched so that, after cutting the notch and bending open the ends 3.5, 3.6, a longitudinal control arm 2 with a cross-section in the shape of a U-profile is obtained. To stiffen the cut and opened notched zone, the longitudinal control arm 2 is welded to triangular insert plates 15.1, 15.2, as shown.

Figure 17:
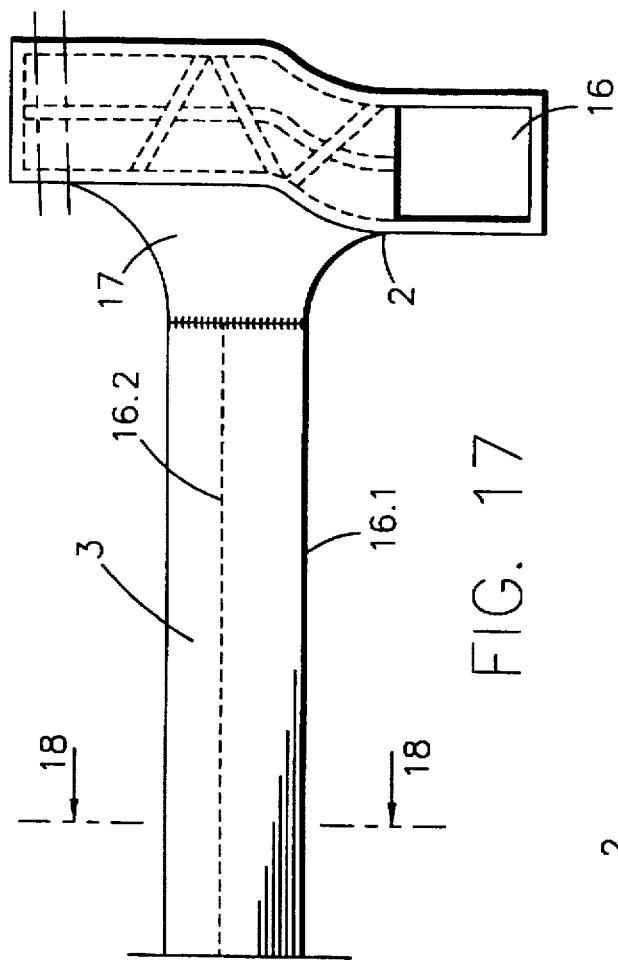
FIGS. 17 to 19 show an axle segment comprising a transverse strut in the form of a V-profile with reinforced edges, welded to a longitudinal control arm.
Figure 18:
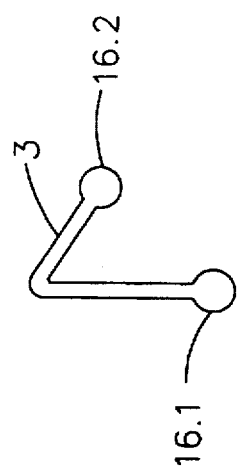
Figure 19:
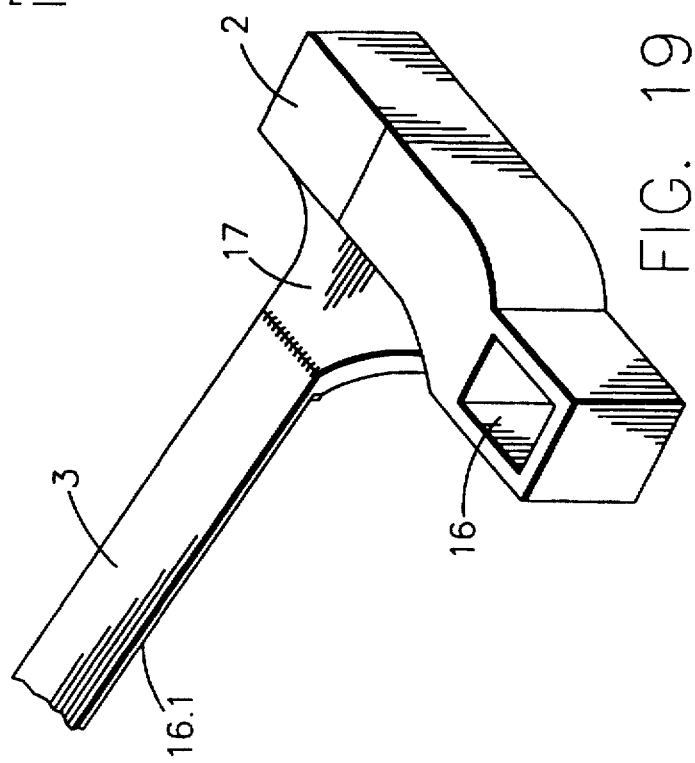

According to FIGS. 17 to 19, the extruded profile of the transverse strut 3 consists of a V-shaped basic profile which, at its run-out ends, comprises thickened reinforced portions for displacing the shear center. In accordance with the invention, the thickened portions 16.1, 16.2 are positioned in such a way as to achieve the most advantageous shear center for the respective twist-beam axle design. For providing a connection with the longitudinal control arm, there is provided a connecting casting with a triangular cross-section 17 which transmits the force flow in a ribbed longitudinal control arm 2. If provided in the form of a casting, the longitudinal control arm 2 may also be open at one end, which offers advantages in respect of supporting it and connecting it to the body frame. The rectangular opening 16 in the control arm 2 assists flanging the wheel carrier plate to the control arm.

Figure 20:
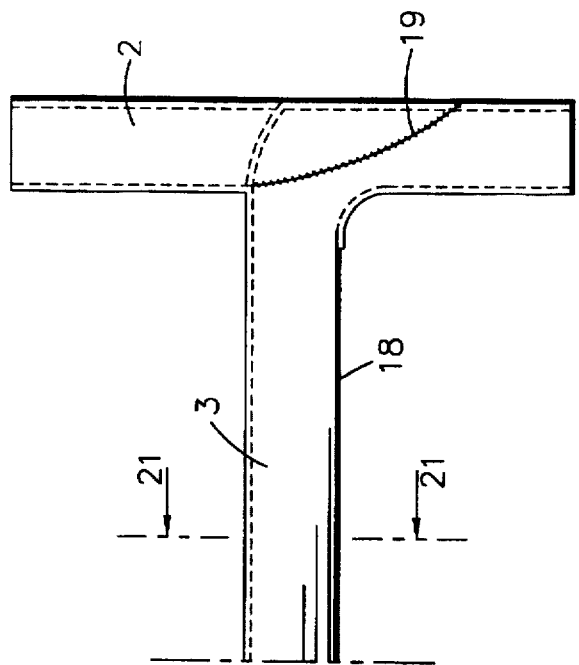
Figure 21:
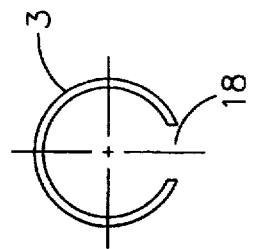
Figure 22:
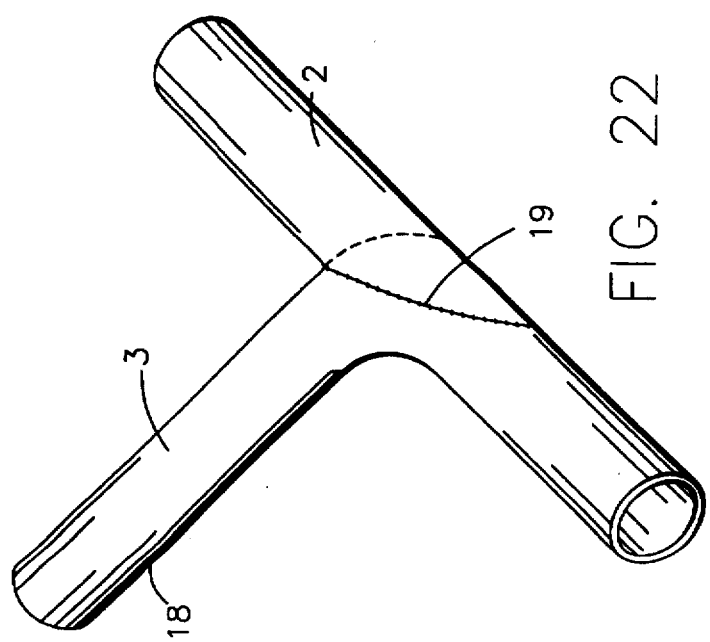

It is also possible to provide the transverse strut 3 and the longitudinal control arm 2 in one piece, which is illustrated in FIGS. 20 to 22, with the transverse strut 3 comprising a flowing end transition at the bend extending towards the longitudinal steering or control arm 2. To ensure that the transverse strut 3 is torsionally flexible, the inside of the strut 3 is provided with a slot 18 which is machined into a tubular profile in the form of an extruded tube. The longitudinal strut is produced by welding the bent transverse strut 3 to an extruded tubular part 2 of the same diameter, with a weld 19 connecting the bevelled end of the extruded tube 2 and the correspondingly cut tubular bend of the transverse strut 3.

Figure 23:
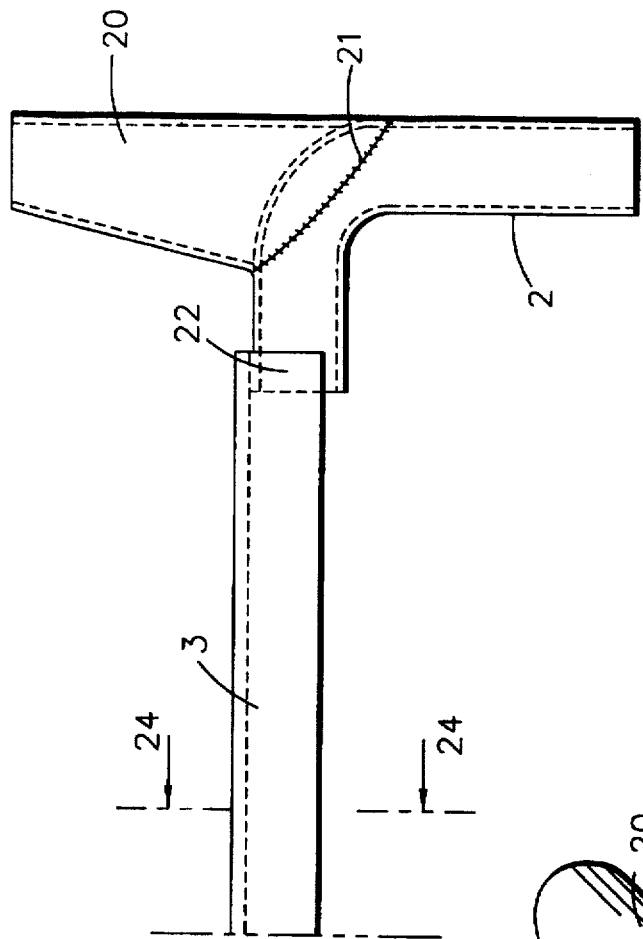
Figure 24:
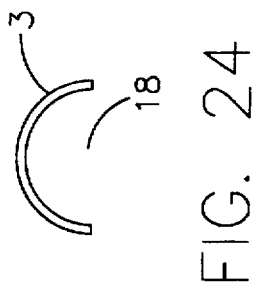
Figure 25:
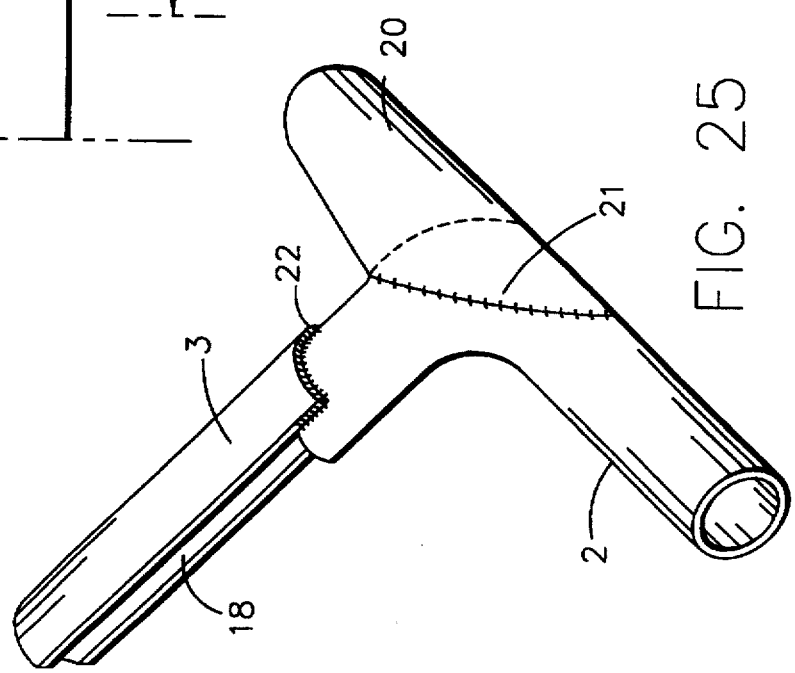
Figure 28:
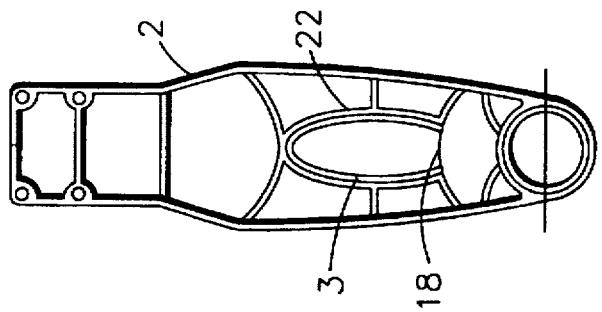
Figure 27:
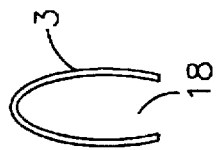
Figure 26:
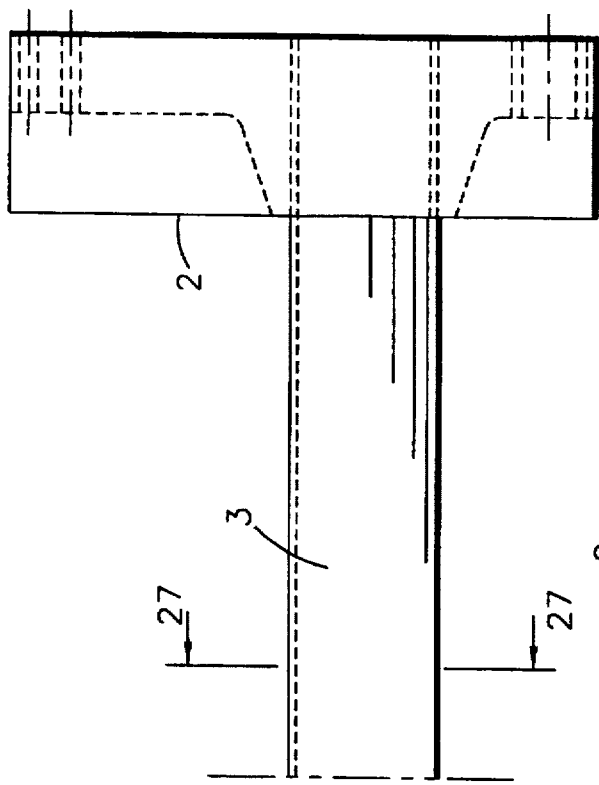
Figure 29:
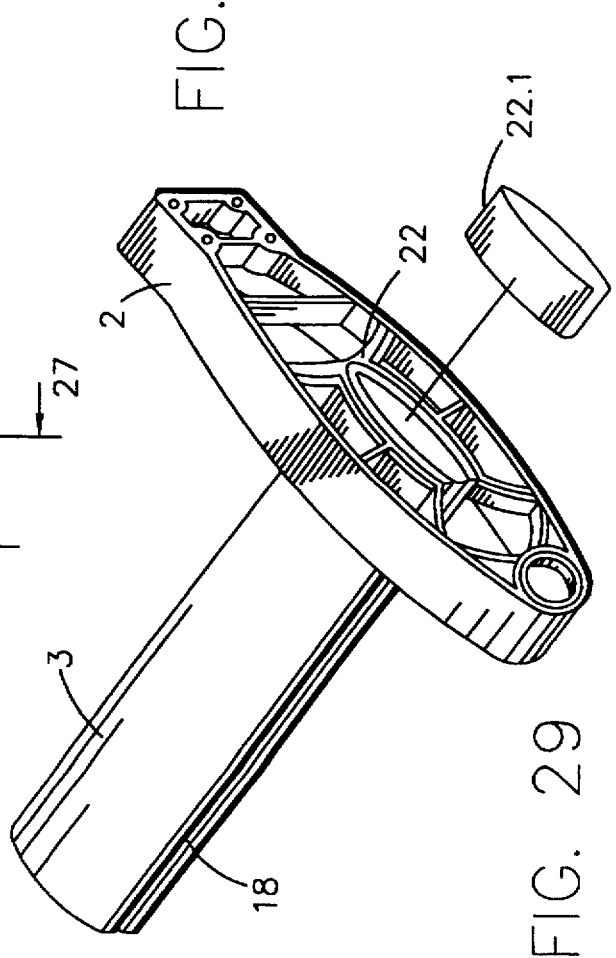

In FIGS. 23 to 25, analogously to FIGS. 20 to 22, the longitudinal strut 2 is formed of a tubular bend which is connected to a further extruded profile 20 by means of a weld 21. The transverse strut 3, as an extruded part in tubular form, may be connected by a weld 22, and for setting the torsional stiffness, one wall end is provided with a slot 18.

According to FIGS. 26 to 29, the transverse strut 3 is also provided in the form of a slotted tube which, in this case, is oval in shape and has a slot 18. The connection with the longitudinal strut 2 is of the form-fitting type because the longitudinal strut 2, in the form of a ribbed extruded profile or casting, is provided with a receiving section 22 adapted to the outer shape of the transverse strut 3. The actual connection may be effected by gluing, welding or shrinking against an insert 22.1.

Figure 33:
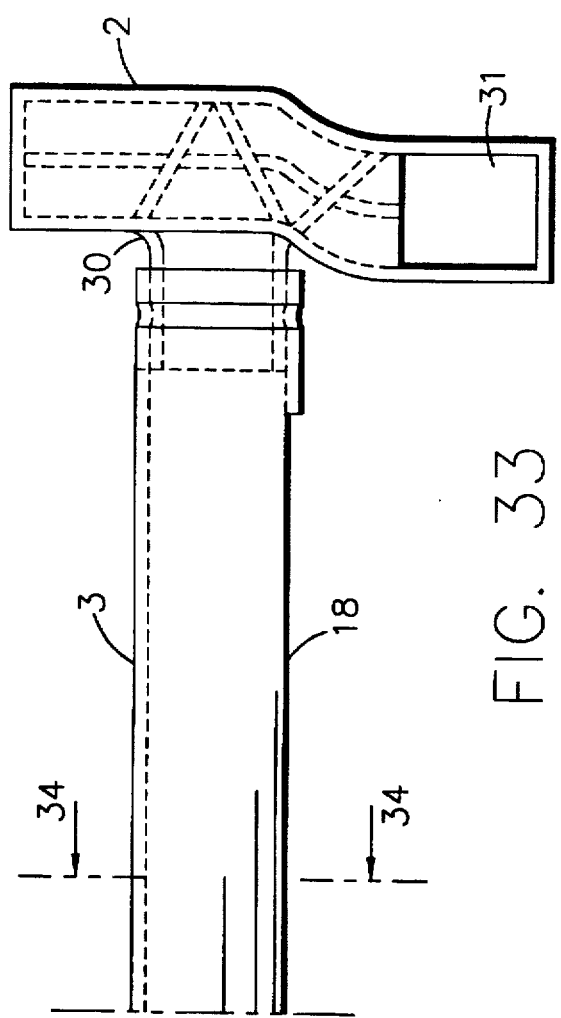
Figure 34:
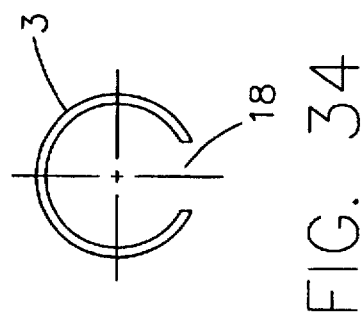
Figure 35:
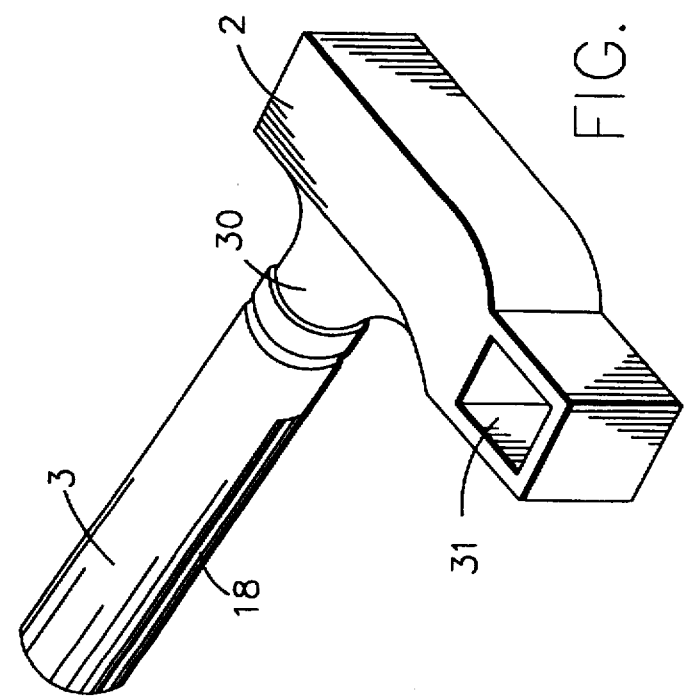

In FIGS. 30 to 32, the profile cross-sections of the transverse strut 3 and longitudinal control arm 2 are extruded profile cross-sections with a substantially round end cross-section. The special feature here refers to the shape of the longitudinal control arm 2 which, by hydroforming, was formed out of an originally round tube cross-section into a curved axle part with a plurality of axle projections 23, 24, 25. Bearing bushings 26, 27, 28 are drawn into said projections and fixed by hydroforming. In the connecting zone extending towards the transverse strut 3 there is provided a backing support 9 which extends inside the transverse strut. The purpose of the following figures is to show other connecting methods which also produce a torsionally stiff and bending-resistant zone of transition between the transverse strut 3 and the longitudinal control arm 2. In FIGS. 33 to 35, this is achieved by applying the "Magneform" fixing technology wherein the tubular transverse strut 3 is drawn back over the connecting piece 30 of the longitudinal control arm 2 and then pressed thereagainst until a form-fitting connection is produced. This type of connection is particularly suitable for longitudinal control arms in the form of castings, the important feature being the dimensional stability of the surface of the connecting piece 30. Opening 31 in the control arm 2 is an attachment means for the wheel plate.

According to FIGS. 36 and 37, the transverse strut 3 is connected to the longitudinal control arm 2 by hydroforming. The initially closed transverse control arm profile 3 with the cross-sectional stampings 3.3., 3.4, 3.5, by subjecting it to hydroforming at its end, is expanded to form a head part 29 and provided with rectangular recess 30. The recess may be accurately produced by milling or punching so that the longitudinal control arm 2 may be inserted in a form-fitting way.

In a further hydroforming process, the formations 36 and 38 in the connecting zone are produced at the end points of the longitudinal control arm 2 through expansion, thus producing a wheel carrier plate or a receiving device for the rubber joint. The means for effecting connections with the body and wheel carrier are thus greatly simplified.

The form-fitting connecting between the transverse strut 3 and the longitudinal control arm 2 can be improved further by a positive engagement 7 in the head part 29. Furthermore, it is possible to apply bonding materials in the joining zone, thus also achieving a material-locking connection. Alternatively, it is possible to use mechanical joining methods such as clinching, through-joining or even thermal methods such as welding. To reduce the torsional stiffness, the transverse carrier 3 is slotted after assembly. The slot plane has been given the reference number 37.

Figure 38:
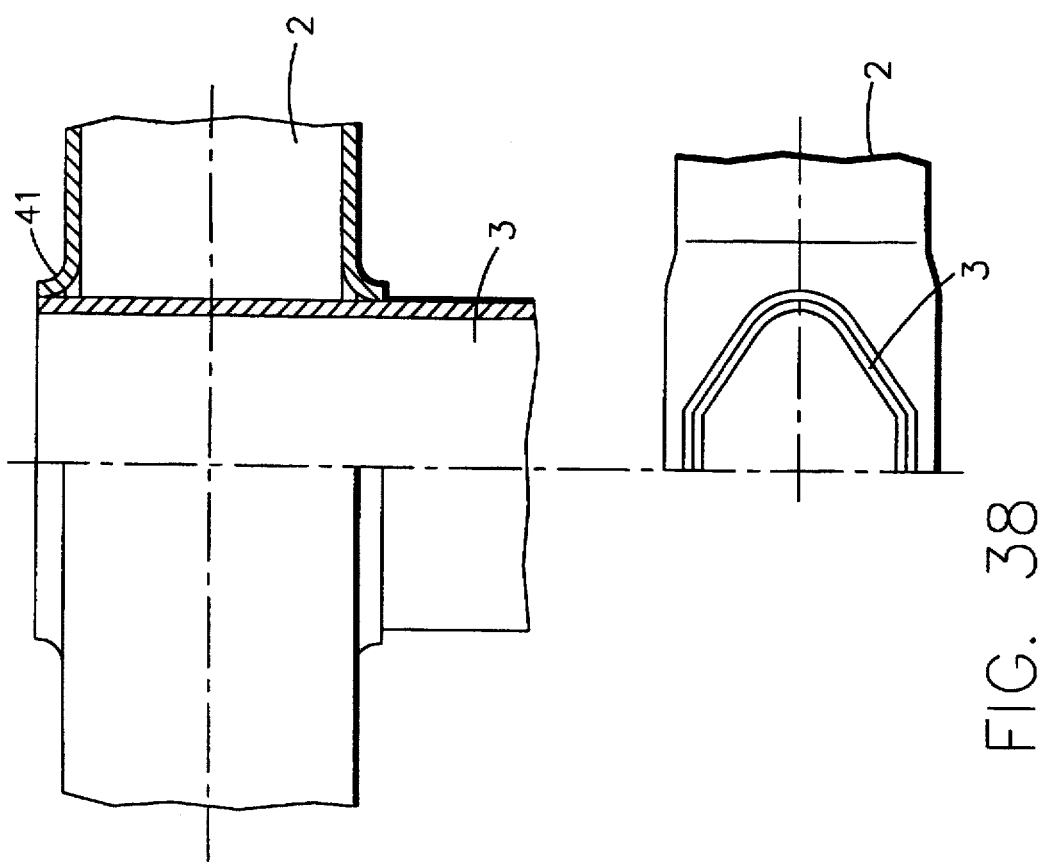

A reversed method of fixing between the transverse carrier 3 and the longitudinal control arm 2 is also possible as shown by FIG. 38. The transverse carrier or control arm 3 is not deformed at its end, but the longitudinal control arm 2 is provided with the recesses or expanded portions 41 into which the transverse control arm 3 is inserted and connected by hydro-forming. In this case, too, additional joining possibilities such as welding, bonding or clinching can be applied. An additional mechanical connection can be provided in that the transverse carrier, in the inserted condition, is expanded in the connecting zone by hydro-forming.

Figure 39:
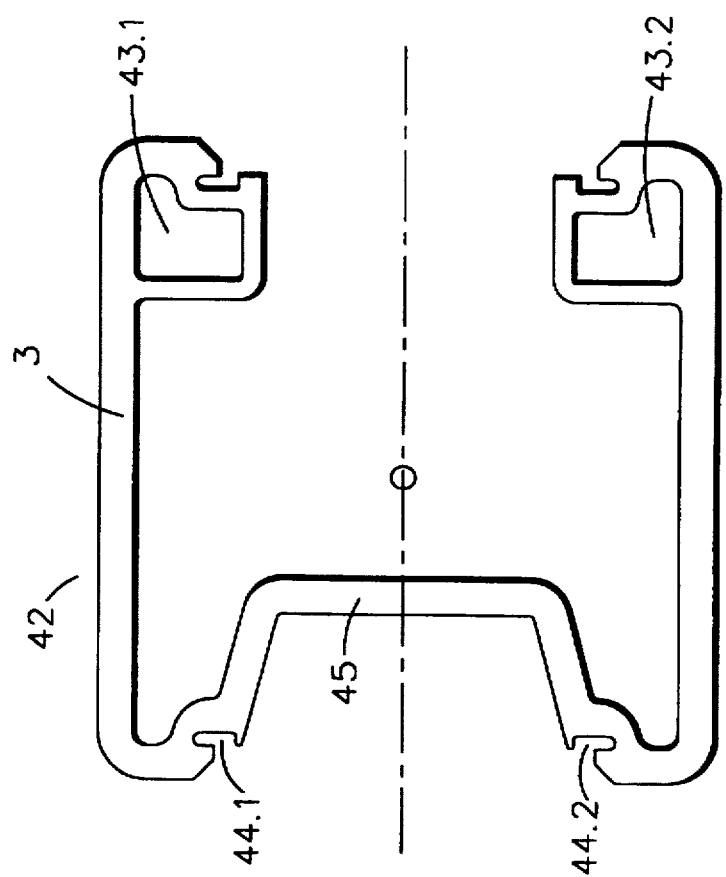
FIG. 39 shows the U-profile cross-section of the transverse strut of FIG. 6.1.

For the purpose of displacing the shear center and influencing torsional stiffness, the inventive idea is developed further in that closed hollow profiles 43.1 and 43.2 are provided at the open ends of the transverse carrier 3. Such an extruded profile is shown in FIG. 39. By displacing the closed hollow profiles, one achieves a displacement of the shear center without at the same time greatly changing the flexural strength and torsional characteristics of the profile. This method allows torsional stiffness and flexural strength to be selected largely independently of one another, whereas it continues to be possible to freely choose the wall thicknesses of the profile.

Figure 40:
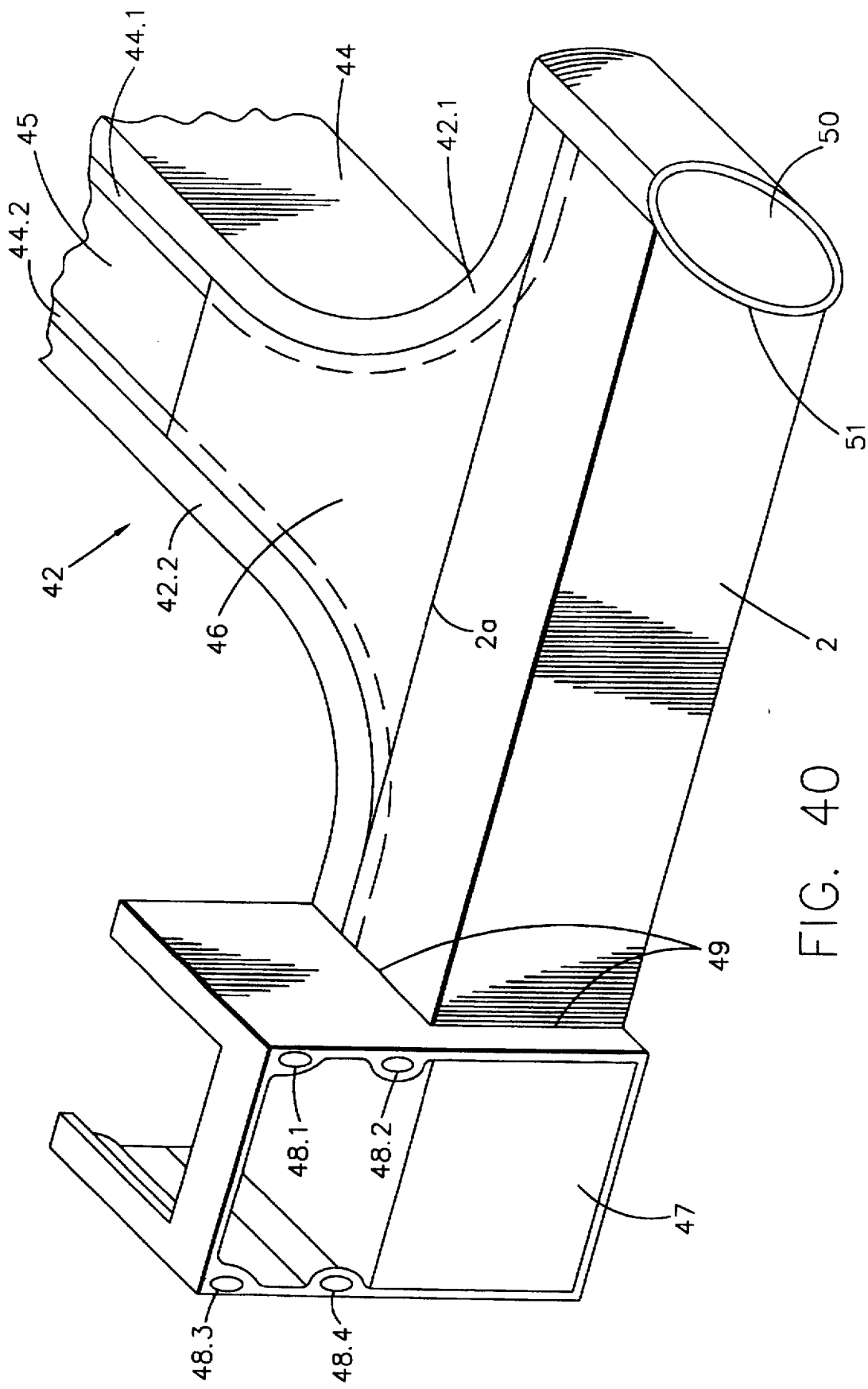
FIG. 40 shows an axle segment comprising the transverse strut of FIG. 39 with an end thereof cut and parted and bonded to a longitudinal control arm integral with a wheel carrier plane.

After removing the connecting piece 45 arranged between the backing supports 44, the ends 42.1, 42.2 of the profile 42 can easily be separated and expanded outwardly; see FIG. 40. The backing supports 44.1, 44.2 remaining at the expanded ends 42.1, 42.2 are inserted into the U-shaped longitudinal control arm profile 2 and welded thereto. The opening occurring between the ends 42.1 and 42.2 and the outer edge of the U-shaped longitudinal control arm profile 2a is closed by a gusset-type profile 46 or by a correspondingly shaped plate, using a thermal joining method.

By using a U-shaped, cut plate for the longitudinal control arm 2, it is possible to apply a butt welding processing for connecting the transverse carrier profile 42 with the help of the backing supports 44.1, 44.2.

As usual, the connecting flanges for providing a connection at the body end and at the wheel axle are prepared at the longitudinal control arm 2. FIG. 40 shows a wheel carrier plate 47 at one end of the longitudinal control arm 2. The wheel carrier plate 47 consists of an extruded profile extruded in the direction the arrow, which method is particularly advantageous for preparing fixing channels 48.1–48.4 for bolting on the axle carrier plate (not shown). The longitudinal control arm 2 is inserted into a recess 49 of the extruded profile and welded thereto.

At the other end of the longitudinal control arm 2, there is provided a tube connection 50 for receiving the rubber joint. The tube connecting piece is also connected to the longitudinal control arm 2 by a weld, with preferably a semi-circular recess 51 being prepared to ensure secure fixing.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A motor vehicle rear axle of the twist beam axle type having a unitary control arm assembly comprising an opposed pair of longitudinal control arms (2) of a high flexural strength and torsional stiffness, each for supporting a wheel carrier plate for a wheel, and an elongate transverse strut (3) which extends between said opposed pair of control arms and has opposed ends, said strut being resistant to bending but resilient relative to torsional stress to twist and thereby vary the location of the shear center thereof, and having a profiled hollow cross-section, each of the opposed ends of said strut being united with a said longitudinal control arm, characterized in that the transverse strut (3) consists of an aluminum extrusion having an extrusion structure which transitions and curves into opposed longitudinal ends extending in the longitudinal direction, parallel to the longitudinal control arms, and become integral with said longitudinal control arms.

2. A motor vehicle rear axle according to claim 1, characterized in that the extrusion structure of said longitudinal strut comprises primary precipitates of an aluminum alloy selected from the group consisting of AlMn, AlMnFe and AlFe.

3. A motor vehicle rear axle according to claim 2 characterized in that the aluminum extrusion consists essentially of an aluminum alloy of the following composition:

| Magnesium | 0.4–1.4% |
|---|---|
| Silicon | 0.4–1.5% |
| Copper | 0.01–1.0% |
| Iron | 0.1–0.8% |
| Manganese | 0.01–1.0% |
| Chromium max. | 0.3% |
| Zirconium max. | 0.3%, | balance aluminum.

4. A motor vehicle rear axle according to claim 1, characterized in that the transverse strut (3), has a hollow profile cross-section in the curved areas of transition thereof extending in towards the longitudinal control arm (2), whereas the remaining regions thereof consist of an extruded open profiled cross-section.

5. A motor vehicle rear axle according to claim 1 characterized in that the extruded transverse strut (3) has a double-T-cross section, and each of the opposed ends thereof is transitioned and curved in opposed longitudinal directions to become integral with one of said longitudinal control arms.

* * * * *

UNITED STATES PATENT AND TRADEMARK OFFICE
CERTIFICATE OF CORRECTION

PATENT NO. : 5,800,024
DATED : September 1, 1998
INVENTOR(S) : Steimmel et al.

It is certified that error appears in the above-identified patent and that said Letters Patent is hereby corrected as shown below:

On the Title page, in the list of Inventors at line [75], the name
"Jorge Ebert" should read --Jörge Ebert--, and the name
"Gerhardt Sollner" should read --Gerhardt Söllner--.

Col. 6, line 54, should read
"extending in the longitudinal direction,"

Signed and Sealed this

Twenty-third Day of February, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,800,024
DATED      : Sept. 1, 1998
INVENTOR(S) : Steimmel et al.

It is certified that error appears in the above-identified patent and that said Letters Patent is hereby corrected as shown below:

On the title page, item [73], "VAW Aluminium AG" should read --VAW aluminium AG and Thyssen Umformtechnik GmbH, both of Germany; part interest to each.

Signed and Sealed this

Fifteenth Day of February, 2000

Attest:

Q. TODD DICKINSON

Attesting Officer

Commissioner of Patents and Trademarks